United States Patent [19]

Modesitt

[11] Patent Number: 4,868,659
[45] Date of Patent: Sep. 19, 1989

[54] DEFLECTION CIRCUIT FOR NON-STANDARD SIGNAL SOURCE

[75] Inventor: Mark E. Modesitt, Greenwood, Ind.

[73] Assignee: RCA Licensing Corporation, Princeton, N.J.

[21] Appl. No.: 44,527

[22] Filed: Apr. 30, 1987

[51] Int. Cl.⁴ .............................................. H04N 5/04
[52] U.S. Cl. .................................... 358/148; 358/158
[58] Field of Search ................................ 358/148, 158

[56] References Cited

U.S. PATENT DOCUMENTS 3,688,037  8/1972  Ipri .
3,878,336  4/1975  Balaban .
3,899,635  8/1975  Steckler et al. .
3,904,823  9/1975  Van Straaten ...................... 358/158
3,916,102 10/1975  Merrell .
4,025,951  5/1977  Eckenbrecht ...................... 358/158
4,063,288 12/1977  Eckenbrecht .
4,228,461 10/1980  Weissmueller .
4,231,064 10/1980  Uchida .............................. 358/158
4,298,890 11/1981  Lai et al. .
4,605,965  8/1986  McGinn .

Primary Examiner—James J. Groody
Assistant Examiner—David E. Harvey
Attorney, Agent, or Firm—Joseph S. Tripoli; Joseph J. Laks; Harvey D. Fried

[57] ABSTRACT

A deflection circuit for a video apparatus operates in a countdown mode in which synchronization of the vertical deflection circuitry is accomplished in precise relationship to the horizontal deflection frequency. In order to permit countdown operation for nonstandard signal sources, such as video games, the countdown mode acceptance window is determined in a manner to encompass the coincidence of vertical sync pulses from signal sources having horizontal line per field ratios that may differ from the NTSC standard.

3 Claims, 1 Drawing Sheet

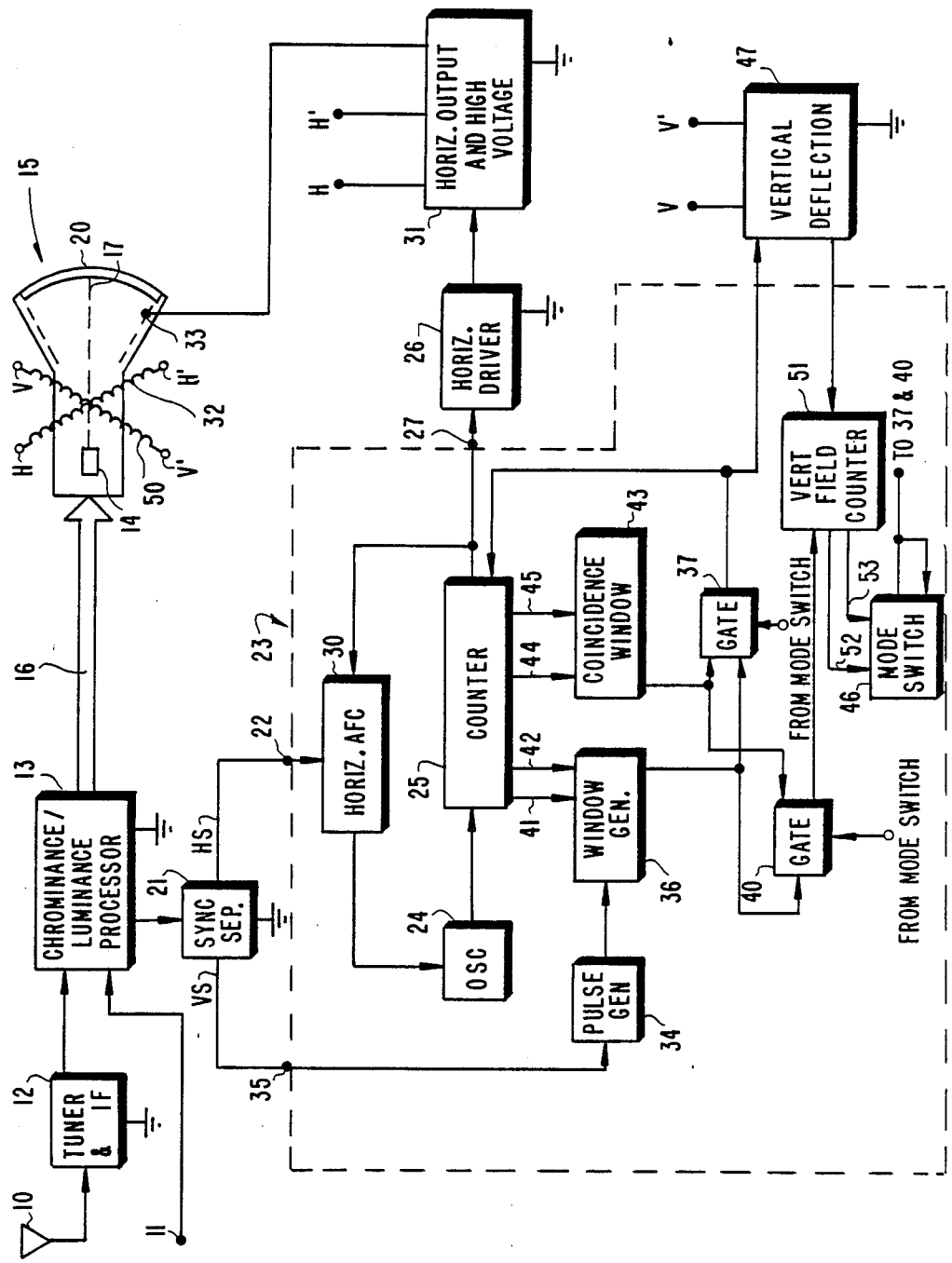

DEFLECTION CIRCUIT FOR NON-STANDARD SIGNAL SOURCE

This invention relates to video apparatus and, in particular, to video apparatus that incorporates deflection circuitry in which the field rate synchronization signal is derived from the line deflection rate.

BACKGROUND OF THE INVENTION

A video apparatus, such as a television receiver or a computer monitor, incorporates some form of image display, which may be a cathode ray tube (CRT), for example. The CRT produces one or more electron beams via an electron gun assembly which are caused to impinge or land on a phosphor display screen by electron beam forming and accelerating voltages. The display screen emits light in proportion to the energy of the electron beam or beams.

A deflection yoke produces electromagnetic deflection fields in response to cyclically varying deflection currents that act to deflect or scan the electron beams across the display screen in a predetermined pattern to form a raster. The electron beam energy, i.e., current, is controlled in response to the information contained in a video signal in order to reproduce a video image on the display screen.

The video signal includes synchronizing information to properly synchronize the line rate or horizontal and field rate or vertical deflection of the electron beams with the video information in order to provide a stable video display. The video apparatus may incorporate circuitry that internally derives horizontal and vertical rate synchronizing (sync) pulses by frequency dividing a high frequency clock signal. The derived horizontal rate pulses of such a countdown circuit are locked to the horizontal rate sync information contained in the video signal by phase locked loop circuitry. For NTSC broadcast video signals that produce a line interlaced scan or deflection, the vertical rate sync information will occur at a predetermined ratio with respect to the horizontal rate sync information. If the vertical rate sync information of the video signal is found to occur at a "standard" ratio with respect to the horizontal rate sync information, synchronization of the vertical deflection circuitry will be accomplished via the internally generated sync pulses. If the video signal vertical rate sync information does not occur at the standard ratio, direct synchronization of the vertical deflection circuit by the video signal vertical rate sync information may be provided. This direct synchronization of the vertical deflection circuitry is appropriate for truly non-standard signal sources, such as a VCR operating in a fast search or slow motion mode, for example.

Personal computers and video game circuitry may provide video signals that produce a noninterlaced scan in which the horizontal-to-vertical sync information ratio is fixed but does not occur at the ratio attributed to a designated standard signal source. In such a situation, direct synchronization of the vertical deflection circuitry by the vertical rate sync information of the video signal will occur. The circuitry incorporated in personal computers and, in particular, video game apparatus, may lack the sophistication of those circuits found in conventional television receivers, for example. As a result, the sync signal may comprise poorly formed pulses which can cause erratic triggering and synchronization of the deflection circuits to occur. Vertical jitter of the displayed video image may result. It would be desirable in such a situation to cause the deflection circuitry to operate in the standard or countdown mode, rather than the nonstandard or direct synchronization mode.

SUMMARY OF THE INVENTION

In accordance with an aspect of the present invention, a deflection circuit for a video apparatus comprises deflection output circuitry responsive to a signal at an input for producing deflection current, a source of first field rate pulses associated with a video signal, and a source of signals having a first frequency. Circuitry frequency divides the first frequency signal to provide line rate representative pulses having a predetermined number in each field rate interval. The circuitry also provides second field rate pulses having a predetermined numerical relationship with the line rate representative pulses. A circuit is responsive to the presence of a plurality of identifiable ones of a number of line rate representative pulses for applying the second field rate pulses to the input of the deflection output circuitry and for applying a signal representative of the first field rate pulses to the input of the deflection output circuitry in the absence of the identifiable ones of the line rate representative pulses.

BRIEF DESCRIPTION OF THE DRAWING

In the accompanying drawing, the sole FIGURE is a block and schematic diagram of a portion of a video apparatus incorporating deflection circuitry in accordance with the present invention.

DESCRIPTION OF THE PREFERRED EMBODIMENTS

Referring to the FIGURE, a video apparatus illustratively receives a video signal either in modulated form via an antenna 10, or as a direct video signal from a video cassette recorder, for example, via an input terminal 11. The signal received by antenna 10 is applied to tuner and intermediate frequency (IF) circuitry 12, which generates an output signal that is applied to chrominance and luminance processing circuitry 13. The direct video signal received via input terminal 11 is also applied to chrominance and luminance processing circuitry 13. Chrominance and luminance processing circuitry 13 produces the drive signals for the electron gun assembly 14 of a cathode ray tube (CRT) 15 via a conductor 16. Electron gun assembly 14 produces one or more electron beams 17 which are made to impinge upon a phosphor display screen 20 located on the front panel of CRT 15.

Chrominance and luminance processing circuitry 13 also produces a composite synchronizing signal, derived from the video signal, that is applied to a synchronizing (sync) pulse separator 21. Sync pulse separator 21 provides line rate, or horizontal, sync pulses on a conductor HS and field rate, or vertical, sync pulses on a conductor VS. The horizontal sync pulses on conductor HS are applied via a terminal 22 to deflection processing circuitry 23, which is illustratively shown by a dashed line as being incorporated as part of an integrated circuit. Deflection processing circuitry 23 incorporates an oscillator 24, having a free running frequency illustratively of the order of sixteen times the horizontal deflection rate. The high frequency signal from oscillator 24 is frequency divided by a counter 25 to provide horizontal rate pulses which are applied to horizontal driver circuit 26 via an interface terminal 27. The horizontal rate pulses from counter 25 are also applied to horizontal automatic frequency control (AFC) circuit 30. AFC circuit 30 controls oscillator 24 in response to the comparison of the horizontal rate pulses from counter 25 and horizontal sync pulses received from sync separator 21 via terminal 22.

The output of horizontal driver circuit 26 is applied to horizontal output and high voltage generating circuit 31, which may illustratively be of conventional design, such as a resonant retrace circuit, for example. Circuit 31 produces a horizontal rate deflection current via terminals H and H' in a deflection winding 32 located on the neck of CRT 15. The deflection current flow in winding 32 generates an electromagnetic deflection field that deflects or scans electron beam 17 at a line rate across phosphor display screen 20 of CRT 15. Circuit 31 also produces a high voltage or ultor potential that is applied to CRT 15 via a terminal 33 in order to provide an accelerating potential for electron beam 17.

As previously described, an NTSC encoded video signal comprises a predetermined number of horizontal deflection or scan lines in each vertical deflection field. For a "standard" signal of this type, deflection processing circuitry 23 can provide synchronization of the field or vertical deflection circuitry via a frequency division or countdown mode in which an internally generated reset or sync signal is applied to the vertical deflection circuitry. The video signal must meet certain criteria in order for the deflection processing circuitry 23 to operate in the previously described standard or countdown mode. For a "nonstandard" signal, such as that provided by a VCR operating in a special effects situation, in which the number of horizontal lines per field is modified, the deflection processing circuitry 23 will operate in a nonstandard or direct sync mode in which the vertical sync pulses from sync separator 21 are utilized to provide direct synchronization of the vertical deflection circuitry.

A more detailed description of the operation of this aspect of deflection processing circuitry 23 is as follows. The vertical sync pulses on conductor VS are applied to a pulse generator 34 of deflection processing circuitry 23 via an interface terminal 35. Pulse generator 34, which may comprise a flip-flop, produces a narrow pulse indicative of the presence of the vertical sync pulse. The output of pulse generator 34 is applied to window generator 36. The window of window generator 36 is determined by pulse counts provided from counter 25. Counter 25 illustratively produces pulse counts at twice the horizontal deflection rate. Therefore, a standard NTSC vertical field having 262.5 horizontal scan lines will comprise 525 pulse counts. The vertical sync pulse for a standard NTSC field will therefore be coincident with the 525th pulse count from counter 25. Window generator 36 is illustratively enabled or opened to respond to the presence of the vertical sync representative pulses from pulse generator 34 by pulse count 465 from counter 25, illustratively provided on conductor 41, and to become disabled or closed by pulse count 593 from counter 25 on conductor 42. The window of window generator 36 is chosen to be of sufficient duration to encompass vertical sync pulses from VCRs operating in special effects modes. Pulse generator 34 is configured to produce pulses having durations of approximately one pulse count. The actual pulse count values provided by counter 25 are given for illustrative purposes only. Window generator 36 produces an output pulse, which is applied to logic gates 37 and 40, that is coincident with the presence of a vertical sync pulse if the vertical sync pulse occurs within the window interval. If the vertical sync pulse does not occur within the window interval, window generator 36 will produce a default pulse occurring coincident to the window disabling or closure pulse count; in this example, pulse count 593.

In order to provide stable synchronization of the vertical or field rate deflection circuitry, and eliminate the need for a vertical hold control, for example, it is desirable to operate deflection processing circuitry 23 in a countdown or standard mode by utilizing the known line per field relationship of the standard NTSC signal. Operation in the countdown mode requires continuing detection of the vertical sync pulse occurrence at the desired horizontal line relationship, which may be accomplished by detection of the vertical sync pulse occurrence at a particular pulse count from counter 25.

Some signal sources, such as personal computers or video games, for example, provide a noninterlaced video signal that has a fixed relationship of horizontal lines per vertical field, but the relationship may not precisely correspond to the standard NTSC ratio, with the result that deflection processing circuitry 23 would ordinarily operate in the direct synchronization mode. If the synchronizing signal is noisy or not precisely formed, as may occur with video games, for example, direct synchronization of the vertical deflection circuitry may result in unpredictable synchronization, causing jitter in the displayed image.

In accordance with an aspect of the present invention, deflection processing circuitry 23 incorporates a coincidence or sync ratio acceptance window generator 43. Coincidence window generator 43 is enabled or opened for a plurality of pulse counts from counter 25. The enabling interval of coincidence window generator 43 is sufficient to detect the presence of vertical sync pulses corresponding to a range of line per field ratios in order to permit deflection processing circuitry 23 to operate in a standard or countdown mode with certain nonstandard video signal sources that provide noninterlaced video signals.

Illustratively, coincidence window generator 43 is enabled by a 524 pulse count from counter 25 on conductor 44, and disabled by pulse count 526 on conductor 45. Coincidence window generator produces an output signal that is applied to gates 37 and 40 during the window enabling interval. Gates 37 and 40, which may comprise conventional logic elements and be implemented in accordance with the integration topology of deflection processing circuitry 23, also receive an input from a mode switch 46 indicative of the current operating mode (countdown or direct synchronization) of deflection processing circuitry 23.

Gate 37 produces an output signal that resets counter 25 and also reset the vertical current ramp generator of vertical deflection circuit 47, which acts to synchronize the operation of vertical deflection circuit 47. Circuit 47 produces vertical deflection current via terminals V and V' in a vertical deflection winding 50 located on the neck of CRT 15. Winding 50 generates an electromagnetic deflection field that provides field rate deflection of electron beam 17 across display screen 20. The output pulse of gate 37 is produced and hence synchronization of vertical deflection circuit 47 is achieved as follows. The logic of gate 37 is configured such that when deflection processing circuit 23 is operating in the countdown or standard mode, the output pulse of gate 37 is produced coincident with the predictable stable enabling of coincidence window generator 43. When circuit 23 is operating in the nonstandard or direct synchronization mode, the gate 37 output pulse is produced coincident with the occurrence of vertical sync within the enabling window of window generator 36, of if sync fails to occur, coincident with the window disabling or closing pulse count.

Gate 40 forms a portion of a circuit, incorporating mode switch 46, that monitors the operation of deflection processing circuit 23 in order to select the proper operating mode. The output of gate 40 is determined as follows. When circuit 23 is operating in the standard or countdown mode and the occurrence of vertical sync, as received from window generator 36, coincides with the enabling interval or coincidence window generator 43, gate 40 produces an output pulse which is applied to and resets a vertical field counter 51. Vertical field counter 51 is incremented by vertical blanking pulses provided by vertical deflection circuit 47. Resetting of vertical field counter 51 acts to maintain the current operating mode of deflection processing circuit 23. In accordance with a novel aspect of the present invention, the enabling interval of coincidence window generator 43 is chosen to encompass the occurrence of vertical sync pulses from certain nonstandard signal sources that produce noninterlaced signals and/or signals that do not precisely conform to the NTSC line per field ratio, thereby permitting the advantageous operation of deflection processing circuit 23 in the standard or countdown mode even when nonstandard signal sources are used.

When circuit 23 is operating in the countdown mode and vertical sync from window generator 36 does not coincide with the enabling window of coincidence window generator 43, the output of gate 40 is inhibited and vertical field counter 51 is not reset. If this condition continues, vertical field counter 51 will continue to be incremented without being reset. After a predetermined number of vertical fields, vertical field counter 51 will produce an output pulse on conductor 52, for example, that is applied to mode switch 46, causing mode switch 46 to produce a signal indicative of a nonstandard or direct synchronization operating mode. In a similar manner, if circuit 23 is operating in a nonstandard mode and vertical sync is not coincident with the coincidence window generator 43 window interval, gate 40 produces an output pulse to reset vertical field counter 51, thereby maintaining nonstandard operation. If sync coincidence within the generator 43 window interval is detected, however, during the nonstandard mode of operation, gate 40 is inhibited from producing an output pulse. After a predetermined number of incremented vertical fields, which may be different than the number of fields required to switch out of the countdown mode, mode switch 46 will produce an output signal on a conductor 53 indicative of a standard or countdown operating mode.

The deflection processing circuit 23 has been described with reference to NTSC standard line per field ratios. It is of course possible to adapt this circuitry to operate at other line per field ratios or with other video signal standards.

What is claimed is:

1. A deflection circuit for a video apparatus comprising:

a deflection output stage for producing deflection current during both countdown and direct synchronization modes of operation;
a first source of a field sync signal associated with a video signal;
a second source of signals having a fixed clock rate frequency;
a frequency divider for frequency dividing said fixed clock rate frequency during both modes of operation to provide successive line rate representative pulses, a predetermined number of said line rate representative pulses occurring within a field interval, wherein a first one of said pulses within a given field interval represents a first predetermined ratio of field period to line period for a noninterlaced video signal, and a second one of said pulses represents a second predetermined ratio for an interlaced video signal; and,
means coupled to said deflection output stage and responsive to the line rate representative pulses and to the field sync signal for determining coincidence between the field period to line period ratio of said video signal and either one of the first and second predetermined ratios to generate a field rate pulse that synchronizes said deflection output stage in the countdown mode of operation, said means otherwise synchronizing said deflection output stage with said field rate sync signal in the direct synchronization mode of operation.

2. A deflection circuit for a video apparatus comprising:

a deflection output stage for producing deflection current;
a first source of a field rate sync signal associated with a video signal;
a second source of signals having a first frequency;
counting means for frequency dividing said first frequency signals to provide successive line rate representative counts, a predetermined number of said line rate representative counts occurring within a field rate interval, wherein first and second ones of said counts represent respective first and second predetermined ratios of field period to line period;
detecting means coupled to said deflection output stage and responsive to the line rate representative counts and to the field rate sync signal for determining coincidence between the field period to line period ratio of said video signal and either one of the first and second predetermined ratios to generate a field rate pulse that synchronizes said deflection output stage in a countdown mode of operation, said detecting means otherwise directly synchronizing said deflection output stage with said field rate sync signal in a direct synchronization mode of operation; and,
a mode switching circuit coupled to said detecting means and responsive to said field rate sync signal for switching said detecting means from said direct synchronization to said countdown mode of operation when the field period to line period ratio of said video signal coincides with either one of the first and second predetermined ratios, the counting means always being incremented independently of the mode switching circuit.

3. A deflection circuit for a video apparatus comprising:

deflection means responsive to an input signal for producing deflection current;

a first source of field rate and line rate synchronizing signals;

a second source of a signal having a line rate related frequency;

means coupled to said second source for frequency dividing said line rate related frequency signal to provide successive line rate representative counts within a field rate interval;

first window generator means coupled to said first source and responsive to first and second ones of said line rate representative counts and becoming enabled during a first interval that begins with said first count and ends with said second count for generating a first pulse synchronized to said field rate synchronizing signal when said field rate synchronizing signal occurs during said first interval;

second window generator means responsive to third and fourth ones of said line rate representative counts that respectively represent first and second predetermined ratios of field period to line period for generating a second pulse within a second interval that begins with said third count and ends with said fourth count, said fourth count being different from said second count; and, means coupled to said deflection means and the two window generating means for applying said second pulse as said deflection means input signal when the field rate and line rate synchronizing signals of the first source have one of the first and second predetermined ratios of field period to line period, and for otherwise applying said first pulse as said deflection means input signal.

* * * * *